United States Patent [19]

Weghaupt et al.

[11] 4,396,847
[45] Aug. 2, 1983

[54] ARRANGEMENT FOR COOLING A SUPER CONDUCTING FIELD WINDING AND A DAMPER SHIELD OF THE ROTOR OF AN ELECTRIC MACHINE

[75] Inventors: Erich Weghaupt, Mülheim an der Ruhr; Lutz Intichar; Christoph Schnapper, both of Erlangen, all of Fed. Rep. of Germany

[73] Assignee: Siemens Aktiengesellschaft, Berlin and Munich, Fed. Rep. of Germany

[21] Appl. No.: 265,454

[22] Filed: May 20, 1981

[30] Foreign Application Priority Data

May 22, 1980 [DE] Fed. Rep. of Germany ....... 3019673

[51] Int. Cl.³ .............................................. H02K 9/00
[52] U.S. Cl. ........................................ 310/52; 310/61; 310/64
[58] Field of Search ................... 310/10, 40 R, 52, 54, 310/53, 60 R, 61, 58, 59, 64, 65

[56] References Cited

U.S. PATENT DOCUMENTS

| | | | |
|---|---|---|---|
| 3,942,053 | 3/1976 | Abolins et al. | 310/52 |
| 4,204,134 | 5/1980 | Fritz et al. | 310/52 |
| 4,228,374 | 10/1980 | Elsel | 310/64 |
| 4,267,474 | 5/1981 | Kullmann | 310/52 |
| 4,278,906 | 7/1981 | Kullmann | 310/52 |
| 4,297,603 | 10/1981 | Weghaupt | 310/64 |
| 4,315,172 | 2/1982 | Intichar et al. | 310/53 |
| 4,323,800 | 4/1982 | Hoffmann | 310/52 |

OTHER PUBLICATIONS

"Proceedings of the 1979 Cryogenic Engineering Conference", Madison Wisc., U.S.A., 8/21-24/79, Paper 1c g, pp. 1-16; M. T. Brown, M. E. Crawford, and J. L. Smith, Jr.

Primary Examiner—R. Skudy
Attorney, Agent, or Firm—Kenyon & Kenyon

[57] ABSTRACT

A cooling arrangement for a superconducting field winding of an electric machine, especially a turbo-generator, has a coolant space which contains a cryogenic coolant fed into it via a feed line, for cooling the field winding, and a coolant supply chamber which contains liquid coolant for cooling a damper shield. So that no separate feed and discharge lines are required for cooling the damper shield independently of the cooling of the field winding, the coolant supply chamber is connected directly to the coolant feed line via a radial connecting line, and the flow cross sections of the connecting line and of the section of the coolant feed line between the connecting head and the connecting point of the connecting line are made large.

6 Claims, 1 Drawing Figure

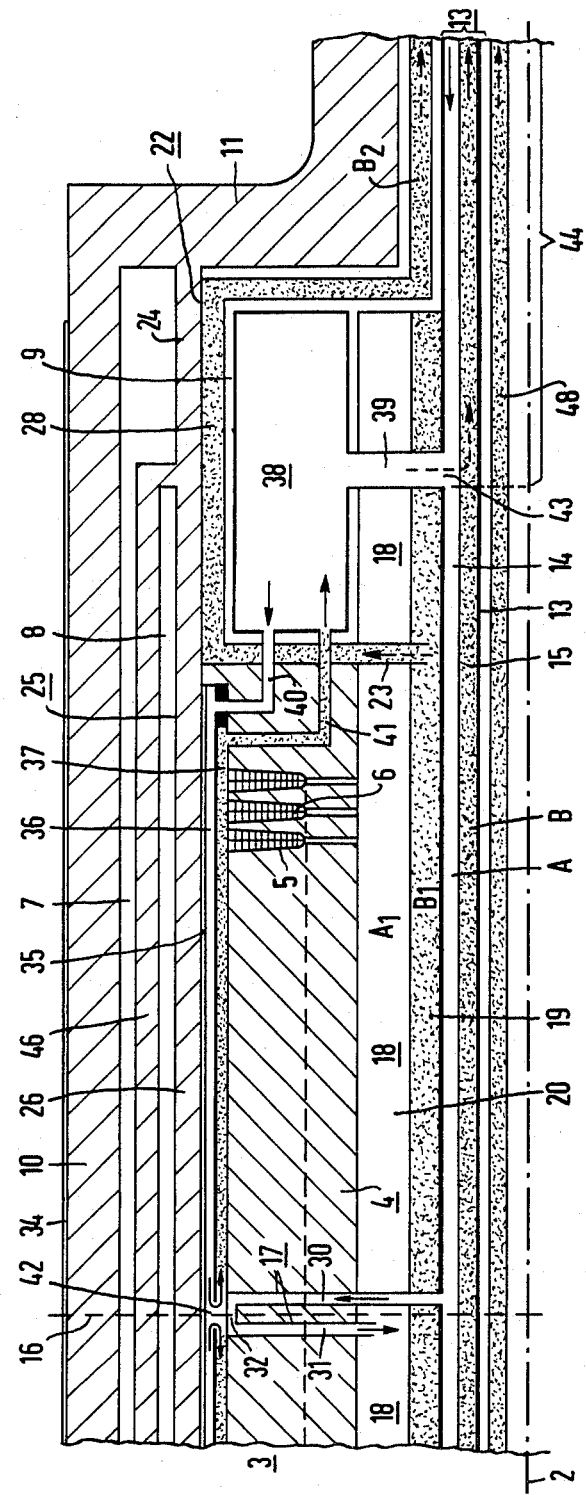

ARRANGEMENT FOR COOLING A SUPER CONDUCTING FIELD WINDING AND A DAMPER SHIELD OF THE ROTOR OF AN ELECTRIC MACHINE

BACKGROUND OF THE INVENTION

This invention relates to electric machines with superconducting windings in general and more particularly to an arrangement for cooling a superconducting field winding in the rotor of an electric machine.

An arrangement for cooling the superconducting field winding of a rotor of an electric machine, especially a turbo-generator, with at least one coolant chamber which contains, in the operating condition, a vaporous and a liquid phase of a cryogenic coolant is known. The coolant is fed at a connecting head under subcritical pressure into a corotating feed line which is connected to the coolant chamber. Coolant paths extend through the field winding and are connected to the liquid space of the coolant chamber occupied by the liquid phase. At least one coolant discharge line is connected to the vapor space of the coolant chamber occupied by the vaporous phase. There is at least one coolant supply chamber containing liquid coolant. At least one further coolant path, which is arranged in loop-fashion, is thermally connected to a damper shield arranged around the field winding and is connected at its start and end to the coolant supply chamber. Such a cooling arrangement is described in the report by M. T. Brown et al. entitled "Rotor Cooling System for a 10-MVA Superconducting Generator" from Proceedings of the 1979 Cryogenic Engineering Conference, Madison, Wis, U.S.A., Aug. 21 to 24, 1979, Paper IC 9.

The superconducting field winding of a generator must be kept at a sufficiently low temperature during the operation of the machine that its superconductors do not undergo a transition into the normally conducting state. In general, cooling with liquid helium as the cryogenic coolant is therefore provided, and the dissipation heat produced in the superconductors and the heat introduced from the outside into the torque-transmitting parts of the rotor body lead to partial evaporation of the coolant. The heat flux introduced into the low temperature region of the rotor, however, can be greatly reduced, according to the principle of counter-flow cooling, if the evaporated but still cold coolant exhaust gas is passed along the torque-transmitting rotor parts in good thermal contact, absorbs from these parts a large part of the inflowing heat, is warmed up in the process and leaves the rotor as warm gas at a connecting head.

In the superconducting field winding itself, dissipation heat is produced, among other things, if the superconductors are subjected to an alternating magnetic field. This takes place in the rotor, for instance, if, in the case of unbalanced load, not all current phases of the stator winding are loaded uniformly, and also after a short circuit switching sequence or in the case of oscillations when the rotor speed temporarily does not agree with the predetermined network frequency. In order to keep the alternating field amplitudes in the superconductors small in such transient operating states, the field winding may be surrounded by one or more damper shields which shield the magnetic field and at the same time damp oscillations. For shielding against low frequency fields, damper shields of thermally and electrically highly conductive material, kept at low temperature, are advantageous. For, during steady state generator operation, practicaly no dissipation heat is produced in a damper shield. A large amount of dissipation heat is temporarily released only during the relatively brief transient operating states, especially in the case of oscillations. Contrary to the superconductors of the field winding, the temperature of which must remain below the transistion temperature of its superconductive material even during the transient operating states, the temperature of the cold damper shield is allowed to rise higher, for instance, to 20 to 30K.

A turbo-generator with a field winding surrounded by such a damper shield is known from the report of the Electric Power Research Institute U.S.A.: "ERPI EL-577, Project 429-1, Final Report", November 1977, pages 3-258 to 3-270. In cooling the field winding, a so-called self-pumping effect is utilized, as is described, for instance, in the dissertation of A. Bejan: "Improved Thermal Design of Cryogenic Cooling Systems for a Superconducting Synchronous Generator", Ph.D Thesis, Massachusetts Institute of Technology (U.S.A.), December 1974, pages 148 to 159. The damper shield of the machine known from the ERPI report is fastened to a support cylinder of the rotor body, in which individual canals are provided which serve as damper cooling canals. For this indirect cooling of the damper shield, liquid helium is provided which flows in these canals due to a co-called thermo-siphon effect. Heat produced in the cold damper shield penetrates the support cylinder, gets into the helium contained in its cooling canals and starts convection there. Due to this convection, the warmed helium flows back into a helium bath present in the center of the rotor, where a corresponding amount of liquid helium evaporates.

In this known cooling arrangement it is assured that the heat from the cold damper shield is not transported directly into the area of the superconducting field winding since the damper cooling canals are thermally insulated from the winding cooling canals. In addition, good heat transfer from the support cylinder to the helium contained in its cooling canals makes rapid cooling of the damper possible. In this cooling arrangement, however, removal of generated gaseous helium is done using exhaust gas lines with a relatively small flow cross section. These exhaust gas lines run along the torque-transmitting parts of the rotor body. A large flow of helium vapor which occurs suddenly in the case of a disturbance then cannot leave the rotor fast enough, so that the pressure in the central helium bath rises accordingly. A consequence thereof is also an increase of the saturation temperature of the helium of this bath, used for cooling the superconducting field winding, and therefore, of the temperature of the winding itself.

These difficulties are largely avoided in the above-mentioned cooling arrangement for a corresponding turbo-generator known from the report from the "Proceedings of the 1979 Cryogenic Engineering Conference". For, in this cooling arrangement, the cooling of two damper shields and the winding cooling are largely separated from each other. Accordingly, there is provided, in addition to a central coolant chamber for receiving the coolant required for cooling the superconducting field winding, a separate cooling supply chamber in which the liquid helium required for cooling the damper shields is stored. In addition, a phase separator for separating gaseous helium components is provided in the coolant loop for cooling the damper shield. Now, if heat is suddenly released in the damper shields, a coolant circulation is developed, due to a thermo-siphon effect, from the helium bath contained in the coolant supply chamber through the first damper shield to a phase separator and through the second damper shield back to the helium bath. Due to the supply of heat, helium vapor is then generated in the helium bath of the coolant chamber, and in the phase separator; this helium vapor can escape through special gas outlets and further, through an emergency outlet provided in the separator. A return valve in the connection between the coolant supply chamber and the coolant space containing the coolant bath for the winding prevents any reaction of the pressure rise in the coolant supply chamber on the coolant bath of the winding. This valve also makes it possible to fill the coolant supply chamber with liquid helium. However, a difficulty still exists with this cooling arrangement, in that the helium vapor, which is formed in the coolant bath of the winding, cannot escape as long as the return valve of the coolant supply chamber is closed. Then, the pressure and therefore, the temperature of the coolant provided for cooling the field winding, can rise however. In addition, proper operation of the return valve with its moving parts can be assured at low temperatures only at relatively high cost.

SUMMARY OF THE INVENTION

It is therefore an object of the present invention to simplify a cooling arrangement of the kind mentioned at the outset, and to improve it in such a manner that the discharge of coolant vapor caused by losses in the damper shield from the rotor is facilitated without appreciable concomitant warming of the liquid coolant which must be provided for cooling the field winding.

According to the present invention, this problem is solved by connecting the coolant supply chamber via a radial connecting line directly to the coolant feed line and for removing gaseous coolant components from the coolant supply chamber toward the connecting head, by making the flow cross section of the radial connecting line as well as the flow cross section at least of the section of the feed line between the connecting head and the point of connection of the feed line accordingly large.

The advantages of this design of the cooling arrangement are, for one, that already existing coolant lines are utilized for feeding the coolant required for the loop to cool the damper shield into the rotor as well as also for removing this coolant. Therefore, separate coupler parts of elaborate design between rotating and stationary machine parts are not required for the damper coolant at the connecting head of the rotor. Through ample design of the flow cross sections of the line parts carrying coolant exhaust gas of the damper cooling loop, it is ensured at the same time that large amounts of exhaust gas which are produced in the event of operating transients can be removed from the rotor without difficulty. Secondly, cooling the damper shield is made possible with this cooling arrangement in such a manner that it is substantially independent of the cooling system for cooling the superconducting field winding. In the event of temperature increases in the cooling loop of the damper shield, a heat transport via the coolant to the conductors of the field winding is therefore largely precluded.

According to a further embodiment of the cooling arrangement of the present invention, the coolant path of the damper shield includes at least one pair of substantially axial coolant lines which are tied together at the point which is farthest removed from the associated coolant supply chamber. Advantageously, one coolant line of each pair is arranged radially further outward while the other coolant line is located radially further inward. In this manner, a very effective coolant flow through the coolant lines, due to a thermo-siphon effect, is made possible.

Other advantageous embodiments of the cooling arrangement according to the present invention are also described.

BRIEF DESCRIPTION OF THE DRAWINGS

The single FIGURE is a longitudinal section through a rotor with a cooling arrangement according to the present invention illustrated schematically.

DETAILED DESCRIPTION

In the FIGURE, the path of a coolant through only part of the rotor adjoining a connecting head, of an electric machine, especially of a turbo-generator, is indicated. The rotor parts not specifically detailed in the FIGURE may correspond, for instance, to parts of a machine which is described in U.S. Pat. No. 3,942,053. From the FIGURE, only a part of the upper half of the rotor with a cooling arrangement according to the present invention can be seen.

A rotor body 3, supported rotatably about an axis 2, contains a winding carrier 4 which is provided with slots 5 into which conductors of a superconducting field winding 6 are inserted. Only some of the slots with the winding parts arranged therein are detailed in the FIGURE. The conductors of the winding 6 contain superconductive material; liquid helium is provided as the cryogenic coolant. For thermal insulation of the winding, which must be cooled to a low temperature, toward the outside, it is surrounded by the vacuum spaces 7, 8, and 9 which are provided in the rotor body 3 and which are located within a cylindrical outer part 10 and substantially radial parts 11 on the end face of the rotor body 3. The rotor parts 10 and 11 are generally approximately at room temperature.

The helium required for cooling is taken from a coolant supply device, not shown in the FIGURE, at subcritical pressure, i.e., for instance, in the normal boiling state at normal pressure or at a slight overpressure of, say, $1.1 \times 10^5$ Pa and a temperature of about 4.4 K, and is fed into the rotor via a helium coupler at a connecting head, not shown in detail. By means of such a helium coupler which is known, for instance, from the publication "Siemens Forschungs-und Entwicklungsberichte", vol. 5 (1976), no. 1, page 13, the coolant is transferred from stationary to rotating machine parts. The coolant thus is transported into a corotating feed line 13 which extends in the axial direction in the interior of the rotor body. This feed line is a double tube which is concentric with the axis 2 and has a coolant guiding space of annular cross section. However, it can advantageously also consist of several individual tubes which are jointly located on the surface of a cylinder, or a single, centered tube if no other lines are required in the center.

Since part of the coolant evaporates when fed into the rotor body, a liquid component of the coolant, designated as A, accumulates within the feed line 13 in a radially outer region 14 under the influence of the centrifugal force, and a gaseous component B accumulates in the region 15 of the feed line 13 facing the rotor axis 2.

The liquid helium required for cooling the field winding 6 is taken from the region 14 of the feed line 13, containing the liquid component A, for instance, in the rotor center indicated by a dashed line 16, and is first transfered via a coolant feed line 17 to a coolant space 18 which is arranged concentrically about the feed line 13.

For cooling the superconducting field winding, a loop is advantageously provided in which the well-known self-pumping effect is utilized. Such a coolant loop is provided, for instance, in the cooling arrangement known from DE-OS No. 28 30 887.

Due to heat inflow from the outside and also due to the dissipation heat generated in the winding parts of the field winding 6, part of the coolant provided for cooling the field winding evaporates. These components accumulate in a region 19 near the axis, designated as the vapor space, of the coolant space 18. In the operating state, there is thus a two-phase mixture of liquid coolant $A_1$ and gaseous coolant $B_1$ in the space 18. During rotation, the phases are separated under the influence of centrifugal forces, so that the heavier liquid coolant $A_1$ accumulates in a liquid space 20 concentrically about the gaseous coolant $B_1$ which is held in the region 19 facing the rotor axis 2.

The coolant vapor $B_1$ contained in the coolant space 18 is discharged to the outside via a specially designed exhaust gas line 22. Here, too, a self-pumping effect is utilized for drawing the gaseous coolant off. For, the coolant gas taken via a radial tube 23 at a point of the vapor space 19 near the axis is warmed up by being used for counter-flow cooling of a torque-transmitting connecting piece 24 of the rotor body 3. This connecting piece 24 is the end piece at the end face of a hollow cylindrical support body part 25 of the rotor body 3 and extends between a cold intermediate piece 26 of this support body part and the warm side portion 11 of the rotor body. The exhaust gas line 22 further contains an axial line section 28 which is thermally connected to the piece 24 away from the axis and acts as a heat exchanger. The connecting coolant exhaust gas warmed up in this manner and designated as $B_2$, is then returned to the vicinity of the axis and discharged from the rotor at a connecting head, not detailed in the FIGURE, and is fed to a refrigerating machine. Due to the self-pumping effect for pumping off the coolant exhaust gas, an underpressure is then advantageously established in the exhaust gas tube 23 and therefore in the coolant space 18, which is, for instance, less than $10^5$ Pa.

Since the coolant in the feed line 13 is at normal pressure or at a slight overpressure, but underpressure prevails in the coolant space 18, pressure equalization must take place between these two spaces. The pressure equalization is achieved in a manner known per se by the particular design of the coolant feed line 17 as a pressure equalization line (see, for instance, "Cryogenics", 1977, pages 429 to 433). Accordingly, the coolant feed line 17 contains a tubular line section 30, which is connected to the feed line 13, leads radially outward, and to the outer end of which a tubular line section 31 leading radially inward is connected which opens into the coolant space 18. It can thereby be achieved that pressure equilibrium prevails at the connecting point 32 away from the axis between the tubular line sections 30 and 31, because the two helium columns in these line sections have different temperatures and therefore, densities, due to the different pressures. Lowering the level in the coolant space 18 toward a larger radius causes, furthermore, a pressure unbalance at the connecting point 32. Then, helium can flow in via the feed line 17 until the equilibrium condition between the pressures is reestablished.

To limit the alternating field amplitudes at the superconducting conductors of the field winding 6, for instance, in the event of a pulse short circuit or oscillations, the field winding is concentrically surrounded by two corotating damper shields 34 and 35. The damper shield 34 is mounted on the outside of the hollow cylindrical outer part 10 of the rotor body 3 and is at room temperature, while the damper shield 35 is arranged on the outside of the hollow cylindrical support body part 25 and is cooled to a low temperature. In this shield 35, which advantageously consists of a material with very high thermal and electric conductivity such as copper, practically no dissipation heat is produced during steady state generator operation. A very large amount of dissipation heat is temporarily released there only during the relatively brief cases of transient operation.

The cooling system required for cooling the inner damper shield 35 is advantageously largely separated from the system for cooling the field winding 6. This damper cooling system contains one or more pairs of axial damper cooling canals 36 and 37, at least one coolant supply chamber 38 and at least one radial, tubular connecting line 39. The coolant supply chamber 38 is connected to the helium feed line 13 and thereby, to the cooling system of the field winding 6, only via this connecting line 39. Each pair of damper cooling canals 36 and 37 is connected to the coolant supply chamber 38 via two connecting lines 40 and 41, the connecting line 40 opening into the chamber 38 radially further outward and the connecting line 41 radially further inward. The two cooling canals of a pair of cooling canals are also advantageously arranged at unequal distances relative to the rotor axis 2. The damper cooling canal 36 is at a larger radius with respect to the axis 2 than the cooling canal 37.

The two cooling canals 36 and 37 of a pair of cooling canals are also connected to each other at a point 42 which is farthest away from the coolant supply chamber 38 assigned to them. According to the illustrated embodiment this junction point is at the center of the rotor as indicated in the FIGURE by the dashed line 16, since it is assumed that a corresponding cooling loop for the cold damper shield is also provided in the part of the rotor not detailed. Thus, a flow of the coolant provided for cooling the damper shield 35 in a closed circuit is made possible. Each pair of cooling canals together with the connecting lines 40 and 41 forms a thermosiphon loop. For, the heat released in the damper shield 35 imparts buoyancy to the helium in the cooling canals 36 and 37 and the connecting lines 40 and 41 toward the rotor axis 2. Thereby, a flow is developed: colder, heavier helium flows from the coolant supply chamber 38 to the damper shield 35, while warmer, lighter helium flows back into the supply chamber. There, the warmed up helium tends to flow toward the rotor axis 2 and gets into the helium feed line 13 via the radial connecting line 39 at a connecting point 43. Part of the helium is evaporated there and leaves the rotor in the gas space 15 near the axis.

In the course of a transient in the operation, especially during a case of oscillation, a large part of the coolant contained in the helium supply chamber 38 evaporates. Removal of the gas quantities produced can advantageously be ensured by making the flow cross section of the tubular connecting line 39, and at least of the section 44, extending between the connecting head and the mouth 43 of the connecting line 39, of the helium feed line 13, large enough. After the disturbance, the coolant supply chamber 38 is then refilled with liquid helium which is taken from an external helium supply unit.

With this cooling arrangement, degradation of the winding cooling by the damper cooling is largely made impossible. Since the axial helium feed line 13 is made large enough, a suddenly appearing quantity of helium vapor can escape from the rotor without a major increase in the pressure. A slight pressure rise in the axial feed line 13, at most, has the consequence that the relatively small amount of liquid helium A present in the feed line is pumped via the feed line 17 into the coolant space 18. Helium vapor cannot get from the feed line 13 into this coolant space 18 since the liquid in the radial canals 30 and 31 of the feed line 17 acts as a barrier. The gas pressure in the axial feed line 13 and in the radial feed line 30 counteracts the pressure of the liquid column, caused by the centrifugal force, in the other radial feed line 31. As long as the gas pressure does not become larger than the pressure of the liquid at the deflection point 32 away from the axis, no gas can therefore get from the axial feed line 13 into the coolant space 18. The pressure of the deflection point 32 depends mainly on the radial distance of the helium level in the coolant space 18 from the axis of rotation 2 and on the distance of the deflection point 32 from the axis of rotation 2. If the latter is, for instance, 0.4 m and is large as compared to the radial distance of the helium level in the coolant space 18, this pressure is about $11 \times 10^5$ Pa at a rotor speed of 50 revolutions per second.

In this cooling arrangement, separate feed and discharge channels for feeding and discharging coolant which is provided for cooling one or more damper shields, are thus advantageously avoided without causing an impairment of the winding cooling system.

The rotor body 3 indicated in the FIGURE also contains a hollow cylindrical part 46 which acts as a radiation shield and is located between the outer part 10 of the rotor body 3 and its hollow cylindrical support body part 25 which surrounds the cold damper shield 35. This radiation shield 46 has its end faces mechanically and thermally connected to the torque transmitting connecting parts 24 of the support body part 25.

In the FIGURE a coolant exhaust gas line 48 near the axis is also shown. The exhaust gas is removed from the rotor through line 48. The exhaust gas is used for counterflow cooling the end piece, not detailed in the FIGURE, on the turbine side of the torque-transmitting hollow cylindrical rotor body part 25.

What is claimed is:

1. In an arrangement for cooling a superconducting field winding in the rotor of an electric machine, especially a turbo-generator, having at least one coolant space which, in the operating condition, contains a vaporous and a liquid phase of a cryogenic coolant which is fed at a connecting head under subcritical pressure into a corotating coolant feed line which is connected to the coolant space, and including coolant paths which are arranged through the field winding and are connected to the space occupied by the liquid phase; at least one coolant discharge line which is connected to the space occupied by the vaporous phase; at least one coolant supply chamber containing liquid coolant; and at least one further coolant path which is arranged in loop-fashion, is thermally connected to a damper shield arranged around the field winding and is connected at its start and end to the coolant supply chamber, the improvement comprising:
   (a) a radial connecting line connecting the coolant supply chamber directly to the coolant feed line;
   (b) the flow cross section of the radial connecting line as well as the flow cross section at least of the section of the coolant feed line between the connecting head and the point of connection of the radial connecting line to the feed line being large enough to ensure discharging gaseous coolant components from the coolant supply chamber toward the connecting head.

2. The improvement according to claim 1, wherein the coolant path of the damper shield comprises at least one pair of parallel, substantially axial coolant lines which are connected together at the point which is farthest away from the associated supply chamber.

3. The improvement according to claim 2, wherein one coolant line of the pair of each pair of lines is located radialy further outward, while the other coolant line is arranged radially further inward.

4. The improvement according to claim 3, wherein the mouth of the coolant line located further outward leading into the coolant supply chamber is radially further outward than the mouth of the coolant line located further inward.

5. The improvement according to one of the claims 1 to 4, wherein the flow of the coolant in the coolant path of the damper shield is due to a thermo-siphon effect.

6. The improvement according to one of the claims 1 to 4, and further including an uncooled damper shield concentrically surrounding the damper shield to be cooled.

* * * * *